FIG.1

INVENTORS,
STANLEY B. JONES,
WALTER E. MEYERHOF

BY
ATTORNEYS.

FIG.2

May 26, 1959 S. B. JONES ET AL 2,888,568
NUCLEAR SPECTROSCOPY WELL LOGGING
Filed Dec. 2, 1953 9 Sheets-Sheet 5

INVENTORS,
STANLEY B. JONES,
WALTER E. MEYERHOF
BY
ATTORNEYS

May 26, 1959     S. B. JONES ET AL     2,888,568
NUCLEAR SPECTROSCOPY WELL LOGGING
Filed Dec. 2, 1953     9 Sheets-Sheet 8

INVENTORS,
STANLEY B. JONES,
WALTER E. MEYERHOF
BY
ATTORNEYS

May 26, 1959  S. B. JONES ET AL  2,888,568
NUCLEAR SPECTROSCOPY WELL LOGGING
Filed Dec. 2, 1953  9 Sheets-Sheet 9

INVENTORS,
STANLEY B. JONES,
WALTER E. MEYERHOF
BY
ATTORNEYS

United States Patent Office 2,888,568
Patented May 26, 1959

2,888,568
NUCLEAR SPECTROSCOPY WELL LOGGING

Stanley B. Jones, Whittier, and Walter E. Meyerhoff, Menlo Park, Calif., assignors to California Research Corporation, San Francisco, Calif., a corporation of Delaware Application December 2, 1953, Serial No. 395,744

8 Claims. (Cl. 250—71)

This invention relates to well logging by the measurement of gamma radiation and in particular relates to an improved method and apparatus by means of which the gamma radiation spectrum may be utilized more accurately to identify and evaluate the presence and proportions of elements in the earth formations traversed by the well bore.

The present invention has for a particular object the provision of a method of and apparatus for determining the unknown constituent elements of an earth formation traversed by a well bore which comprises irradiating the earth formation with a source of neutrons, positioning a detector adjacent the earth formation and vertically spaced with respect to the source, detecting the neutron-capture gamma rays instantaneously emitted by the nuclei of elements in excited states within the earth formation when neutrons from said source are captured by the nuclei, and recording in accordance with the depth of the source and detector in the well bore the number of neutron-capture gamma rays of characteristic energies as a quantitative and qualitative measure of the constituent elements of an earth formation.

In a preferred form of apparatus for carrying out the method of the present invention a source of neutrons, such as a polonium-beryllium neutron source, is adapted to be positioned in a logging sonde and shielded with bismuth to provide essentially pure neutron irradiation for an earth formation traversed by a well bore whose unknown constituent elements are to be identified. A detector, such as a scintillation phosphor of sodium iodide activated with thallium, is located a predetermined distance from the source and shielded by bismuth both from gamma rays originating within the source and from low-energy gamma rays scattered by the formation. Further, in accordance with the invention, the detector is shielded by a material, such as boron, having a large neutron-capture cross-section and giving only a low-energy gamma ray as the result of neutron capture, thereby preventing thermal neutrons diffused in the formation from reaching the detector. Further, the bismuth shielding adjacent to the detector does not itself produce high-energy neutron-capture gamma rays which would effectively obliterate the signal energies to be measured by the detector. Means are provided for measuring efficiently the energy of individual neutron-capture gamma rays received by said detector, said neutron-capture gamma rays being instantaneously emitted by nuclei of elements in excited states within the earth formation due to capture of neutrons from said source. The frequency of repetition in a given time of each neutron-capture gamma ray of a characteristic energy is then recorded as a measure of the relative amount of a constituent element in the earth formation being investigated.

Heretofore, gamma radiation well logging has been carried out by the use of ionization chambers or Geiger counters and absorption apparatus which are relatively inefficient and give only indifferent or indistinct indications of the elements present in well formations. While it has been suggested that detectors, such as ionization chambers, may be used for determining the source and type of gamma radiation originating in a well bore due either to natural or artificially-induced radioactivity, such detectors in practice are not capable of measuring the energy of individual gamma rays arriving at the detector. One reason that such detectors, when employed for well logging, cannot be used to measure the energies of individual gamma rays is that the gas pressure within such detectors must be of the order of 1000 p.s.i. so that the detection efficiency will be sufficiently high. The high pressure of the gas makes the electron and ion collection time very long, of the order of seconds, so that electrical signals from many individual gamma rays overlap completely. Consequently, the detector signal at any given time is proportional to the total energy originating from many gamma rays, and it is impossible to distinguish the effect of individual gamma rays in any way. Further, it is not practical to use any type of ionization chamber for the precise measurement of the energies of individual gamma rays in an uncollimated beam of gamma radiation, which is the situation prevailing in well logging.

As contemplated by the present invention, on the other hand, a crystal, such as a sodium iodide, thallium-activated crystal, is a dense solid, having a high density of electrons with which an electron set in motion by a gamma ray must collide, so that those electrons of high energy originating within the crystal are slowed down, and stopped, during their attempted passage through the crystal. The time required to bring the electron to rest is extremely short, being of the order of a milli-micro-second. The crystal abstracts the entire energy of the electron that is set in motion by the original gamma ray and converts an essentially constant fraction of it into a light pulse or scintillation. The scintillation has a duration time for thallium-activated sodium iodide of about one-quarter of a microsecond. Hence, with choice of source strength and shielding in accordance with the present invention, it is possible to have scintillations occur individually with a negligible number of instances in which overlapping of pulses takes place. The crystal is therefore made capable of a discrete measurement of the entire energy of said original gamma ray. Essentially a known fraction of the said entire energy is converted into photons of light which can in turn be converted by photoelectric tubes and auxiliary electronic circuits, as taught hereinafter, to provide a voltage pulse whose magnitude is proportional to said entire energy.

This invention involves broadly an improved combination of well logging apparatus comprising a gamma-responsive scintillation counter including a phosphor and photomultiplier, a linear amplifier, and an electronic differential discriminator, or an oscilloscope and camera, which will measure and indicate the relative number of scintillations giving origin to electrical pulses of a particular value which are characteristic of particular elements present in well formations. These results enable the user to correlate various formations from well to well, and also to identify the nature, and to a great extent the composition, of the formations and fluids encountered in a single well.

The present application is a continuation-in-part of Stanley B. Jones application Serial No. 246,041, filed September 11, 1951, now abandoned in favor of the present application.

Further objects and advantages will be apparent from the following description and from the attached drawings, which form a part of this specification and illustrate preferred embodiments of the invention.

It should be remembered in connection with the following description that for low gamma ray energies, the photoelectric effect predominates in interactions of gamma radiation with phosphors. At medium gamma ray energies, the Compton effect becomes important, and at high energies the pair-production effect predominates. In the direction of a neutron-capture gamma ray, that is, a gamma ray emitted by the nucleus of an element in an excited state produced by capture of a neutron, the pair-production effect constitutes an important fraction of the total number of events occurring in the detecting apparatus if the detector consists of a material such as sodium iodide with an effective atomic number in the medium to high range of values. Neutron-capture gamma rays normally have high energies of from about 2 to 10 million electron volts (m.e.v.), and it is the measurement of these high energies to which the present invention is particularly directed.

In the identification of constituent elements of an earth formation traversed by a well bore by the detection of these high-energy neutron-capture gamma rays, we have found that extraneous low-energy gamma rays, which originate in several ways and exist in considerable number, are particularly susceptible to Compton scattering and photoelectric absorption, and may be so effectively screened or excluded from the detecting device to provide improved resolution of the measuring instruments. This improved resolution permits positive identification of the source element of these higher energy gamma rays by measurement of their characteristics energies. When neutron-capture gamma rays are produced by conversion of a nucleus of a constituent element in the earth formation to a higher mass number of neutron capture, the instantaneously emitted high-energy gamma rays are directly indicative of the constituent element which produced the excited nucleus, and such high-energy gamma rays frequently produce an electron-positron pair, otherwise known as pair-production, in the detector.

It will further be remembered that, upon the creation of an electron-positron pair by a high-energy gamma ray and upon annihilation of the positron, there are produced two annihilation quanta, each having an energy of substantially one-half m.e.v. These annihilation quanta may both escape from the detector, or ony one of the two may escape, or neither may escape. Accordingly, each such neutron-capture gamma ray from a particular excited nucleus may surrender its total energy to the detector, or the total energy minus substantially one-half m.e.v., or the total energy minus substantially one m.e.v. As will be explained more fully hereinafter, certain of these energy peaks may be utilized to identify characteristically the nucleus within an unknown earth formation wherein said neutron-capture gamma ray originates.

Figure 1:
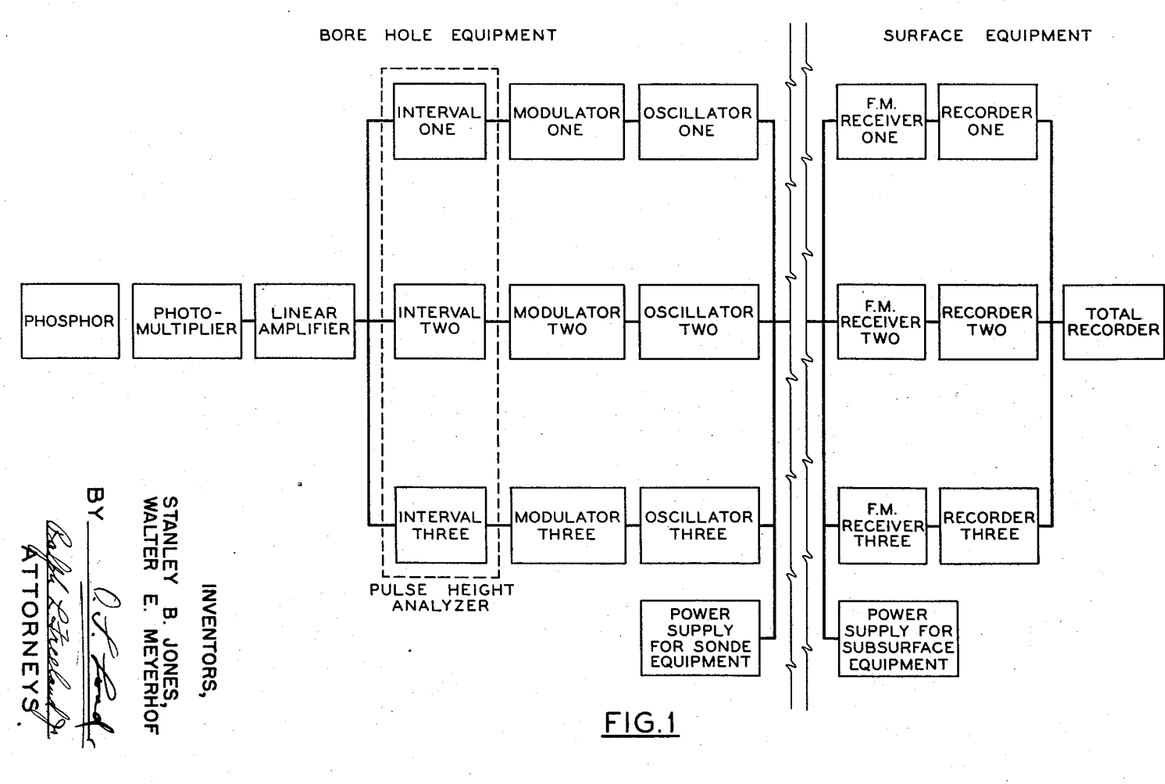
Fig. 1 is a block diagram of one arrangement of surface and subsurface equipment utilizing this invention.
Figure 2:
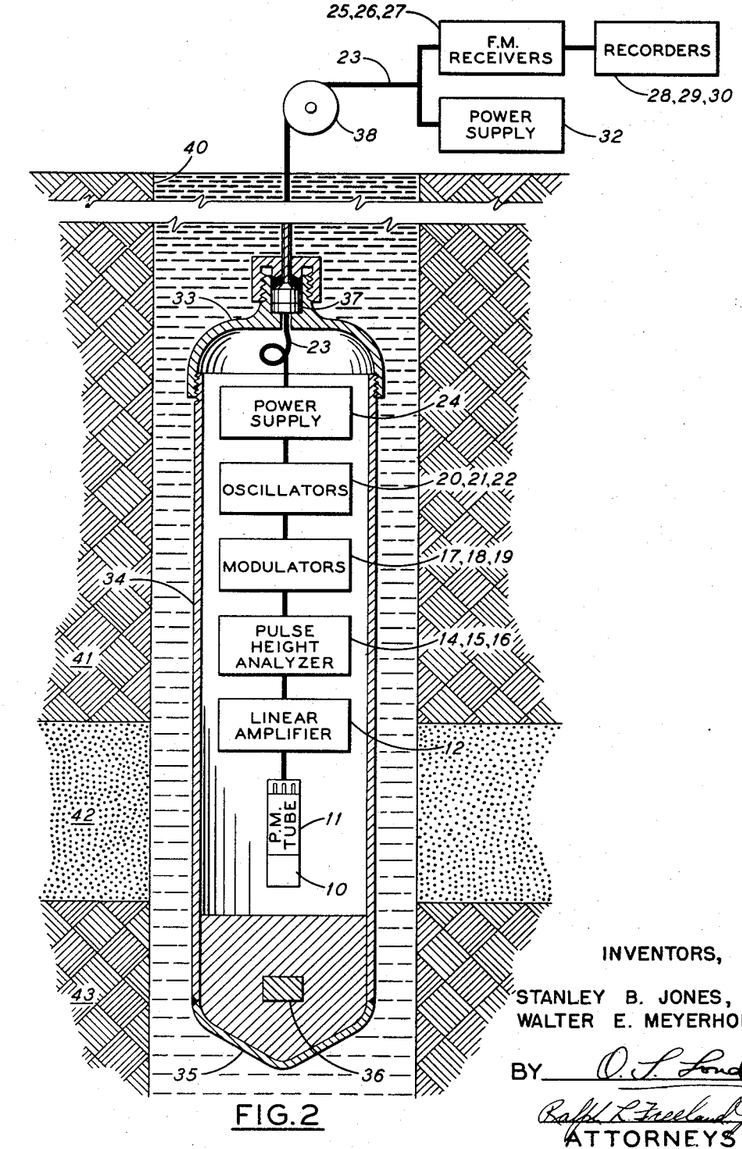
Fig. 2 is a schematic drawing of one form of subsurface gamma radiation detecting equipment or sonde and signal transmitting means therefor corresponding to the arrangement of Fig. 1.

Referring now to the drawings, and in particular to Fig. 1, there is shown a block diagram illustrating the several components of a preferred arrangement of a combination for measuring gamma ray energies. The left portion of the drawing illustrates the bore hole equipment which is enclosed in the usual water-tight casing and traversed through the well bore by means well known in the art of well logging. The gamma radiation which may be detected by this improved measuring combination may be either naturally present or artificially induced in the formations to be logged. The induced gamma radiation may be either instantaneously emitted by nuclei of elements in an excited state (neutron-capture gamma rays), or by radioactive nuclei in a relatively stable condition. The neutron source for induced gamma radition, such as a capsule of a powdered mixture of an alpha-emitter, for example polonium and beryllium or the like, is suitably shielded and traversed throughout the well bore (Fig. 2). The preferred detector for the gamma radiation from the formation and any fluids therein is a scintillation counter, such as a solid phosphor 10 of suitable material, for example, thallium-activated sodium iodide, which produces light photons corresponding in total number or intensity, to the energy of the gamma ray detected thereby. A fraction of the light photons is in turn converted by the photomultiplier tube 11 to an electrical pulse of corresponding amplitude or magnitude. The fraction of the photons converted to an electrical pulse is made as large as possible because the variations in the fraction are of physical and statistical origin and are an important limitation on the resolving power of the scintillation spectrometer. The electrical pulses pass through the linear amplifier 12 to a pulse height analyzer, generally designated 13, which contains one or more differential discriminators, 14, 15, 16. Types of differential discriminators suitable for the present arrangement are now well known in the electronics art.

The separated or discriminated electrical pulses are passed through modulators 17, 18, and 19 to oscillators 20, 21, and 22 for combining into suitable signals to be transmitted through cable 23 to the surface recording equipment shown on the right side of the broken lines of Fig. 1. A suitable power supply 24, which may be a plurality of dry cells is contained in the casing or sonde with the apparatus just described. Alternatively, either alternating or direct current of suitable frequency and potential may be transmitted through cable 23 for a source of power.

At the surface, cable 23 leads to a plurality of frequency modulated receivers 25, 26, and 27 which are adjusted to distinguish signals from their corresponding oscillators, modulators, and differential discriminators and impress their respective signal upon suitable recorders 28, 29 and 30. Desirably, but not necessarily, a total recorder 31 may combine the outputs of separate units 28, 29 and 30. A power source 32 is provided for energizing the surface equipment just described and also for energizing subsurface equipment, if desired.

Fig. 2 is a schematic drawing of an arrangement for measuring neutron-capture gamma ray spectra in a well bore. The well sonde or logging unit, generally designated 33, has a strong closed metal casing 34 supported by the insulated cable 23. In the lower part of casing 34 is a lead or bismuth shield 35 in which is embedded the fast neutron source 36, previously mentioned, which may be a capsule of powdered polonium and beryllium but may be a mixture of radium-beryllium. Suitably spaced and shielded from the capsule 36 is the gamma radiation-sensitive phosphor 10 equipped with a light reflector, desirably surrounding the crystal, for directing light to the adjacent photomultiplier tube 11, to which are connected the linear amplifier 12, and the differential pulse height analyzers 14, 15, 16; modulators 17, 18, 19; oscillators 20, 21, 22; and sonde power supply 24. Cable 23 leads through a packing head 37 to a suitable hoisting means generally designated 38 at the top of the well bore and thence to the receivers 25, 26, 27, recorders 28, 29, 30 (previously described), and power supply 32.

Figure 2A:
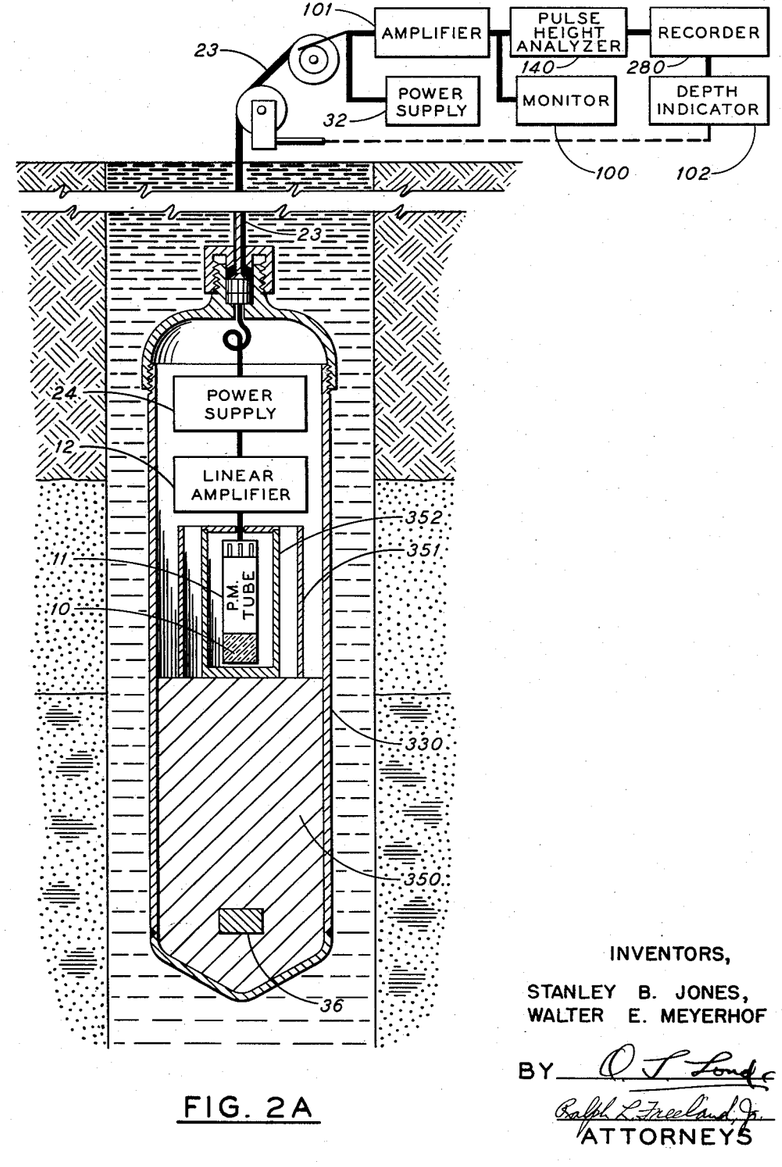
Fig. 2A is a schematic representation of an alternative form of surface and subsurface equipment particularly adapted to detect and measure neutron-capture gamma rays.

Referring now to Fig. 2A, there is illustrated therein a preferred arrangement of apparatus for logging neutron-capture gamma rays. In this form of apparatus, the source of fast neutrons 36, which is preferably a capsule of polonium-beryllium, is encased in a shield 350 within housing 330. Shield 350 is constructed from material selected particularly to attenuate the gamma rays emitted by the fast neutron source 36. Additionally, this material of shield 350 is constituted so that it produces few high-energy neutron-capture gamma rays. In the preferred form of apparatus, this shield 350 is desirably constructed of bismuth which has a very small capture cross-section, so that few neutron-capture gamma rays are produced within the shield material itself.

By providing a sheld of bismuth, within which neutron source 36 is positioned, the formation whose constituents are to be identified is to a high degree shielded from gamma rays originating within the source. This feature is of particular importance since all known neutron sources generate gamma rays in addition to neutrons. For example, gamma rays are generated by a source such as radium-beryllium at a rate of the order of 25,000 gamma rays for each neutron emitted by the source. Even for a source such as polonium-beryllium which has a very low gamma ray background, about 25 gamma rays are emitted for each neutron. The gamma rays originating within the source would result, without shield 350, in a very large number of gamma rays traveling directly into the detector 10 from source 36. In accordance with the present invention, these difficulties are obviated by shield 350 absorbing a large number of gamma rays which would otherwise interfere with the desired signal in the detector.

It will be noted that source 36 is positioned substantially adjacent to detector 10, thus making the problem of shielding even more critical with respect to directly-incident gamma rays. This positioning of detector 10 adjacent both the formation and source 36 is dictated by the maximum diffusion distance of both the fast neutrons produced by source 36 and the resulting thermal neutrons which produce the desired neutron-capture gamma rays, utilized by the present apparatus to identify constituent elements of the earth formation. Additionally, the close spacing between source 36 and detector 10 is required for the detection of neutron-capture gamma rays since this type of gamma ray is emitted instantaneously by an excited nucleus after capture of a thermal neutron. In the present arrangement, this excited nucleus is contained within the formation whose constituents are to be identified, and this species of gamma ray is not emitted after a short time delay, such as a time long enough to permit a detector to be moved into position adjacent a formation after the nucleus has been excited by neutron capture.

It is further essential, as mentioned before, that the shield 350 does not itself produce numerous high energy neutron-capture gamma rays, and thus blank out the detector to those gamma rays originating in the target nuclei within the formation. For this reason, we have found that bismuth is an ideal material since bismuth has a capture cross-section for neutrons that is very small relative to that of the vast majority of the elements under investigation and, hence, does not give origin to more than a relatively small number of neutron-capture gamma rays.

As stated hereinbefore, the neutron-capture gamma rays which are particularly indicative of the constituents of an unknown earth formation are in general of high energy; that is, from about 2 to 10 m.e.v. Accordingly, we have found it desirable to shield the detector 10 from multitudinous gamma rays of substantially lower energies which may be present either due to gamma rays emitted by the source and back-scattered to the detector in spite of the source shield 350, for the reasons described above, or as a result of multiple scattering of the neutron-capture gamma rays after emission by the excited nuclei in the formation. To this end we have provided an additional shield 351 which is also constructed of bismuth or similar material to surround the detector 10. As shown, shield 351 is desirably a thin cylindrical shell surrounding the detector. In practice, this shell has been constructed of bismuth of a thickness of approximately ⅛ inch.

As shown in Fig. 2A, a second shield 352 is provided substantially surrounding detector 10 and photomultiplier tube 11. In accordance with the present invention, shield 352 is desirably constructed of boron, and, more particularly, may be compounded of boron carbide, which has a large neutron-capture cross-section producing only low-energy gamma rays. Shield 352 thus provides shielding for detector 10 against thermal neutrons diffused in the formation as a result of the slowing down of the fast neutrons emitted by source 36. In this manner, thermal neutrons are to a high degree prevented from producing within the detector material itself high-energy neutron-capture gamma rays or radioactivity.

Detector 10 in the arrangement of Fig. 2A is desirably a crystal of relatively dense material. One such material is a crystal of sodium iodide activated by thallium. The detector of Fig. 2A, as in the arrangement of Fig. 2, is preferably surrounded by a light reflector, such as an aluminum shell, coated internally with a layer of magnesium oxide, capable of reflecting substantially all of the light developed in the crystal when a gamma ray reacts with the material of the crystal to produce a scintillation.

Further, in accordance with the present invention, as embodied in the arrangement of Fig. 2A, the photomultiplier tube 11 is connected to a single linear amplifier 12 corresponding to the amplifier arrangement of Fig. 2. However, as distinguished from the arrangement of Fig. 2, the signals, which are electrical pulses corresponding in magnitude or amplitude to the energy of the incoming neutron-capture gamma ray, are transmitted directly through cabel 23 to a plurality of differential pulse height analyzers, identified generally as 140. It is to be understood that the pulse height anlalyzer 140 may have a plurality of channels for discriminating between the incoming pulses which are then transmitted to a recorder 280. The individual pulse heights characteristic of the energy of individual gamma rays produced by neutron-capture may be displayed on recorder 280 in accordance with the depth of the logging sonde as measured by the depth indicator 102. As indicated, the logging sonde may be provided with a power supply 24 corresponding to that illustrated in Fig. 2, and a surface power supply is provided for the recording equipment, indicated generally as 32.

A monitoring unit 100, which may comprise a cathode ray oscilloscope, may be connected directly to the logging sonde through the logging cable and ahead of the pulse height analyzer 140. Monitoring unit 100 may be viewed directly and, if desired, the screen photographed in relationship to the depth of the logging sonde in the well bore. Such direct observation of the incoming pulses will appear as spectral traces of varying amplitude with the location and intensity of each line dependent upon the quantity of a particular gamma ray emitted by excited nuclei of a particular element. Thus, the intensity of the line is directly indicative of the quantity of a constituent element in the formation.

As mentioned hereinabove, detector crystal 10 is desirably sodium iodide activated by thallium, which, in the present combniation, is of particular importance due to its density and the relatively high effective atomic number of its chemical constituents. This high density assures that a high percentage of the gamma rays traversing the detector crystal will interact with the detector crystal and so be detected. The fast electrons that are produced by the interaction have a range within the crystal of the order of millimeters and so are generally stopped within the crystal which is selected to have dimensions of the order of centimeters. The relatively high atomic number of the iodide component of the crystal material is important because it causes a sizeable fraction of the neutron-capture gamma rays incident upon the crystal to interact with the crystal by the pair-production effect. This type of interaction causes the incident gamma ray to deliver a known fraction of its full energy in the interaction, whereas in the second type of commonly-occurring interaction (the Compton effect) the gamma ray delivers only an indeterminate fraction of its energy in the interaction, and the gamma ray may be able to leave the crystal with some of its original energy. As mentioned hereinbefore, three different amounts of energy may be surrendered in the crystal as a result of pair-production. One member of the pair is a positive electron that is annihilated by a negative electron when it is brought to rest. Its mass energy, together with that of the negative electron is converted into the energy of two annihilation quanta, of equal energy, that travel in opposite directions. These annihilation quanta will travel a distance of the order of a centimeter in a crystal detector before interacting with the crystal. Hence, one or both of them will escape the crystal with significant frequency and the intensity of the scintillation will be diminished accordingly. We have found it advantageous to make the shape and size of the crystal detector about that of the cylinder one inch both in height and diameter so that it is small enough to facilitate the escape of both annihilation quanta, but large enough to record a considerable number of events. Thus the intensity of scintillations produced by pair-production is generally proportional to the energy of the gamma ray incident upon the crystal detector minus the mass energy of positive electron and negative electron. A crystal of greater size than specified above would give origin to appreciable numbers of scintillations with intensities proportional to the total energy of the incident gamma ray or to the energy of the gamma ray minus the mass energy of one electron. Hence, the gamma ray spectrum analysis procedure would be more involved than for a crystal of the dimensions specified above. Of course, a crystal of, say, greater diameter but less height may be used to accomplish the same purpose. Thus, the neutron-capture gamma ray surrenders its energy to the crystal by producing a light pulse in which the number of light photons produced is proportional to that fraction of the energy of the gamma ray that is dissipated within the crystal. This energy conversion of the gamma ray occurs within the crystal in about ¼ microsecond. Such short duration of the light pulse permits a very fast counting rate for the neutron-capture gamma rays and, accordingly, provides a high speed for logging of the constituent elements of an earth formation traversed by a well bore. Such increased speed may be had with the combination illustrated in Fig. 2A without sacrifice of resolution of the constituent elements by their characteristic neutron-capture gamma rays.

In operation, the well sonde, 33 (Fig. 2), or 330 (Fig. 2A) is traversed through the well bore 40 at a desired rate depending upon the type of formations 41, 42 and 43 encountered, the magnitude of the fast neutron flux emitted by capsule 36, and the sensitivity or gamma-responsive characteristic of the pick-up or detector element 10, 11. The effect of fast neutron impingement upon the formations is well known in general to those skilled in this art. As discussed above, one effect that is particularly utilized in this invention is the simultaneous gamma radiation emission of the neutron-bombarded elements due to neutron capture by the nuclei of constituent elements of the formation, some of which will be described in more detail below. It has been found that the relative counting rates compared with pulse height or amplitude are indicative if not completely characteristic of, the presence and amounts of certain elements present in the earth either as solids in the formation structure or as liquids or gases in the fluids present in the formations.

Figure 2B:
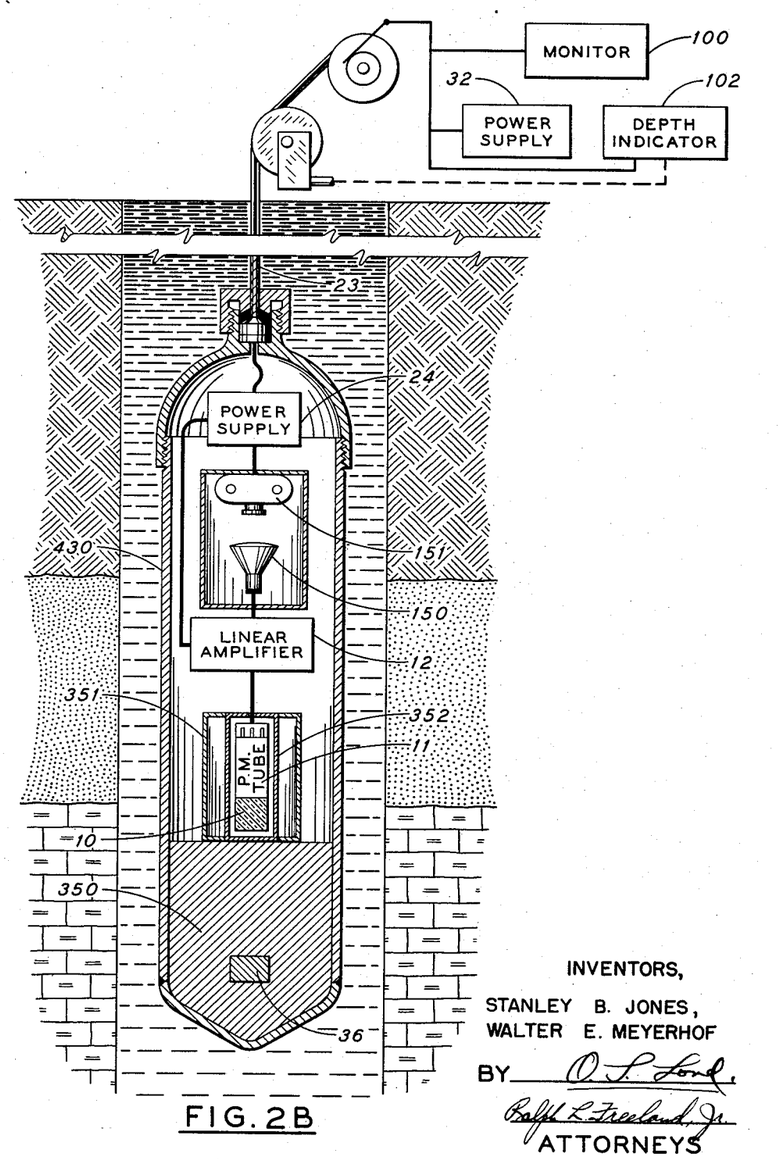
Fig. 2B is a schematic representation of another form of subsurface equipment particularly adapted to detect and measure neutron-capture gamma rays.

Referring now to Fig. 2B, there is illustrated therein a further arrangement of apparatus for logging neutron-capture gamma rays. The apparatus is similar to the arrangement of Fig. 2A with respect to the neutron source 36, the shielding, crystal detector 10, photomultiplier tube 11, and linear amplifier 12. However, in the present embodiment the signal analysis is accomplished by the use of an oscilloscope tube 150, together with a camera 151. Camera 151 is placed within the logging instrument 430 so that the electrical signals to be analyzed are not transmitted over the logging cable as in the arrangements of Fig. 2 or 2A. Consequently, a cable of conventional design for logging purposes can be used. The operation of the system shown in Fig. 2B is as follows: Gamma rays detected in the crystal provide electrical signals that are generated and amplified as in the Fig. 2A embodiment. These signals are delivered directly to oscilloscope tube 150. The oscilloscope tube is provided with a triggering circuit to initiate the horizontal sweep circuit which deflects the electron beam along the x-axis at a constant rate. The pulse amplitude governs the deflection of the beam along the y-axis of the face of oscilloscope tube 150. The gain of amplifier 12 is adjusted so that the range of pulse amplitudes displayed on the oscilloscope tube properly corresponds to the range of energies of the neutron-ly capture gamma rays which are of interest. An analysis of the electrical pulse height spectrum from linear amplifier 12 is accomplished by taking a time exposure with the camera of the face of the oscilloscope tube. The oscilloscope beam intensity and shutter opening on the camera are adjusted so that individual pulses will not record on the film. A photographic image is produced only when a sufficient number of electrical pulses have been displayed on the oscilloscope tube to produce a statistically reliable spectrum. As an example, about one million electrical pulses may be displayed on the oscilloscope tube during a single exposure.

In operation, the well sonde 430 is traversed through the well bore at a desired rate depending upon the type of formations under investigation, the magnitude of the fast neutron flux emitted by the source, the sensitivity of the crystal detector, and the degree of accuracy desired. For example, the sonde may be moved at a speed such that about one million gamma rays are analyzed over a 10-foot vertical interval. A photograph is taken of the oscilloscope tube face during traversal of the sonde through this 10-foot interval. The data on the photograph thus represent a gamma ray spectrum averaged over this 10-foot vertical interval. The film is then selectively or automatically advanced for another exposure which will be representative of the next 10-foot interval, and so on. Of course, it may be desirable under certain circumstances to hold the logging instrument stationary during the photographic exposure if a precise measurement is desired for a single position in the well bore.

As shown hereinbefore in Figs. 3 to 10, inclusive, the characteristic energies of certain elements are graphically represented. These figures will be used to describe the type of information that it is possible to obtain with the arrangement of Fig. 2A or 2B to identify the characteristic energies of the neutron-capture gamma rays useful in identifying the presence of such characteristic elements in sedimentary rocks as silicon, iron, non-radioactive potassium, non-radioactive aluminum, hydrogen, chlorine, sulfur, and calcium.

Figure 3:
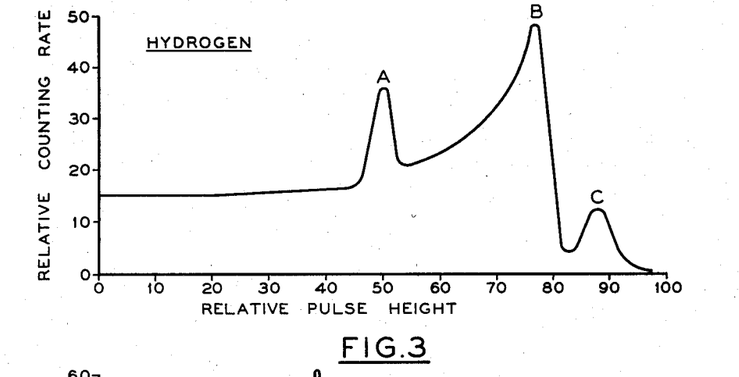
Fig. 3 is a chart illustrating relative pulse heights for gamma radiation from neutron-irradiated hydrogen, as found in water, due to pair-production, Compton and photoelectric effects occurring in the detection process.
Figure 4:
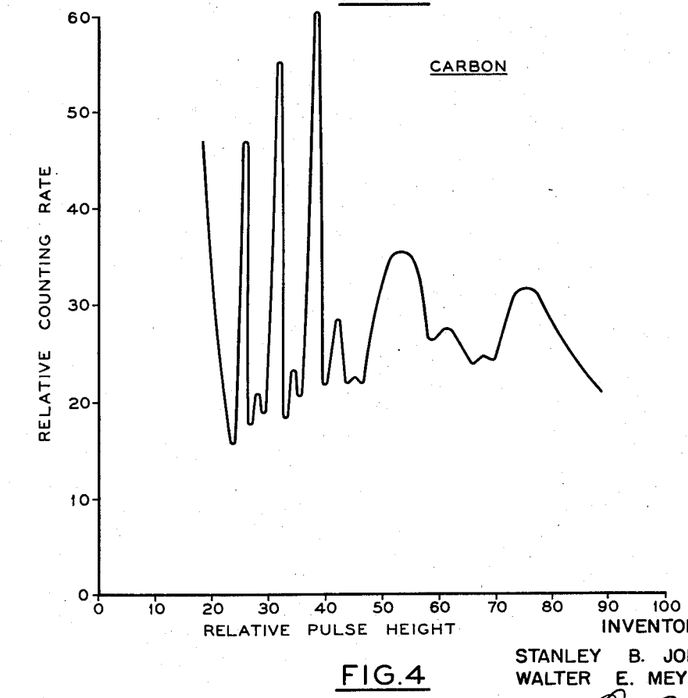
Fig. 4 is a similar chart illustrating relative pulse heights for gamma radiation from neutron-irradiated carbon showing pair-production peaks.
Figure 5:
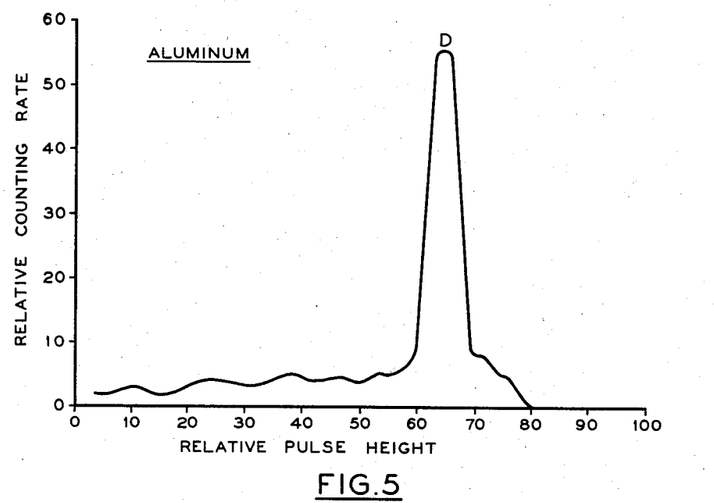
Fig. 5 is a similar chart illustrating relative pulse heights for gamma radiation from neutron-irradiated aluminum due to the pair-production effect.

As illustrative of the type of gamma radiation which may be measured, Fig. 3, for example, shows three definite peaks of activity for hydrogen, the first due to pair-production (A), the second due to the Compton or recoil effect (B), and the third or smallest (C) due to the photoelectric effect. Fig. 4 illustrates the several distinctive peaks of activity of neutron-capture gamma radiation for carbon due to electron pair-production in the crystal by the gamma radiation. Fig. 5 shows a similar curve for aluminum, the largest peak (D) due to pair-production in the crystal for the most prominent neutron-capture gamma ray.

Figure 6:
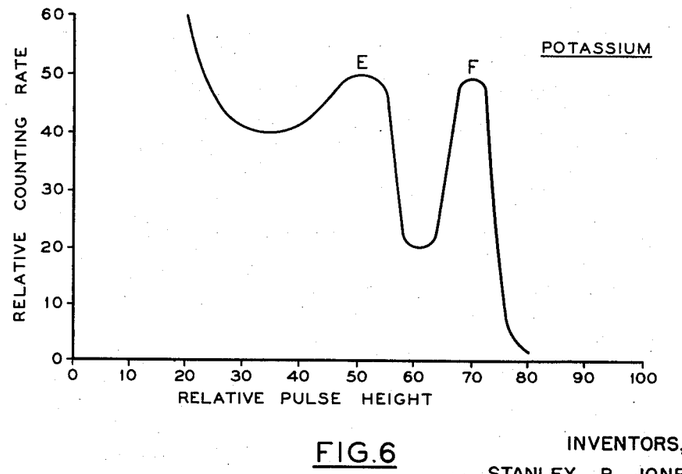
Fig. 6 is a similar chart illustrating relative pulse heights due to the Compton and photoelectric effects for gamma radiation spontaneously emitted from the naturally-occurring potassium isotope of mass 40.

Fig. 6 illustrates the peaks of activity of potassium due to the gamma radiation emitted spontaneously by the isotope of mass 40 which may be normally present in an earth formation. The first peak (E) is due to the Compton effect, and the second (F) is due to the photoelectric effect.

The graphs of Figs. 3 to 6 described above are indicative of the type of gamma ray spectra which may be obtained when relatively pure substances in small quantities are irradiated with a neutron source to produce neutron-capture gamma rays. Figs. 7 to 10, inclusive, are graphs of actual neutron-capture gamma ray spectra observed when various combinations of materials, such as those encountered in earth formations traversed by a well bore, are irradiated by neutron source and detector arrangements corresponding to those illustrated in Fig. 2A and 2B.

The graphs of Figs. 7 to 10 were obtained by an arrangement reproducing to a high degree conditions representative of bore hole conditions. These graphs illustrate many of the major chemical constituents of the earth formations under investigation which may be identified.

In this arrangement, a tank was used containing various materials corresponding to the composition of natural formations. The tank was cylindrical with a height of 5 feet and a diameter of 3½ feet. A vertical steel pipe was placed down the center of the tank to simulate the well bore. Logging instruments similar to those shown in Figs. 2A and 2B were lowered down the well-bore pipe. The arrangement was such that the dimensions of the tank, as given above, were large enough that the earth formations contained therein were essentially infinite in extent for purposes of the neutron-capture gamma ray energy measurements made in accordance with the logging method of this invention.

Figure 7:
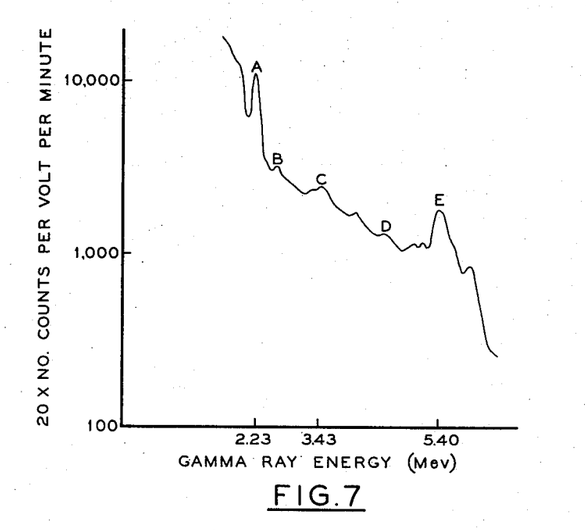
Fig. 7 shows a neutron-capture gamma ray spectrum measured in accordance with the present invention in a formation of limestone plus fresh water and particularly illustrates the direct indication of the presence of calcium and hydrogen therein.

As illustrative of the type of neutron-capture gamma radiation which may be measured in an unknown formation, Fig. 7 for example, shows such a spectrum measured for a formation containing limestone and fresh water. The spectrum peak marked "A" in this graph originates from the neutron-capture gamma ray of hydrogen. The spectral peaks B, C, D and E originate from neutron-capture gamma rays of calcium. This spectrum was obtained by the use of an electronic discriminator.

Figure 8A:
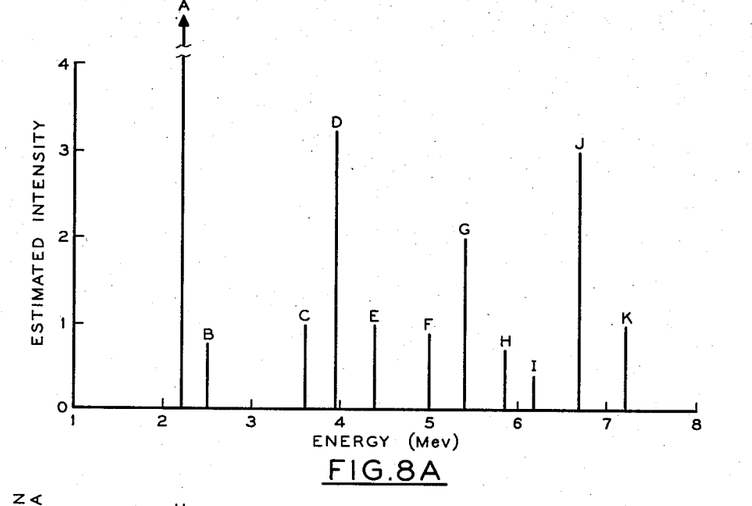
Fig. 8A shows a neutron-capture gamma ray spectrum for a formation of shale and fresh water.

The photographic method of spectrum analysis is the most sensitive method under certain conditions for analyzing gamma ray spectra and it is frequently desirable to use the original negatives for visual analysis of the measurements in order to realize maximum sensitivity. Fig. 8A shows the results of such an analysis by visual examination of a photographic negative and particularly illustrates a spectrum obtained for a formation containing shale and water including estimated intensity of each spectral peak. The peak A in Fig. 8A originates from the neutron-capture gamma ray of hydrogen. Peaks B, C, D, and possibly E and F originate from neutron-capture gamma rays of silicon. Peaks G and H originate from a combination of neutron-capture gamma rays of sodium, calcium and silicon. Peaks J and K originate from neutron-capture gamma rays of iron. While not all of these peaks are specifically characteristic of particular elements, cross correlation between shales is made possible by comparison of similar spectral graphs.

Figure 8B:
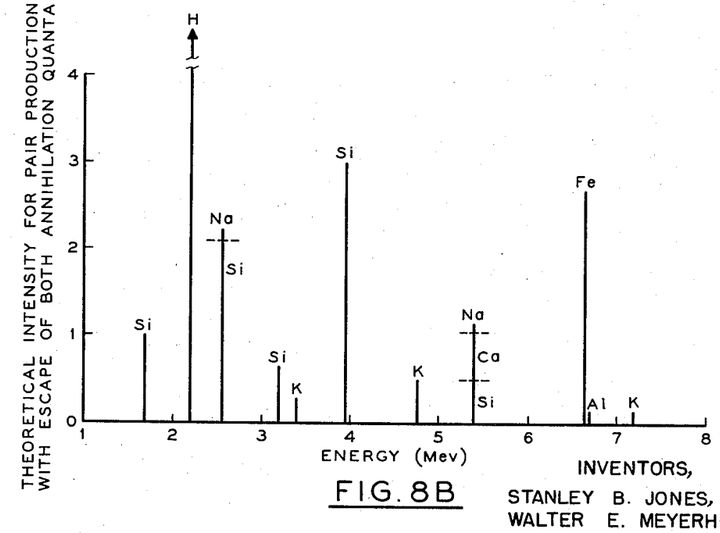
Fig. 8B illustrates a theoretical spectrum for a shale formation.

The spectrum shown in Fig. 8B is constructed on the basis of a chemical analysis made on the same shale formation of Fig. 8A and a prediction of the type of neutron-capture gamma ray spectra that should be expected, based upon measurements of neutron-capture gamma ray spectra for small samples of pure elements when irradiated by a beam of thermal neutrons. The spectrum of Fig. 8B represents the ideal data that would be obtained for a shale formation if the pair-production effect only occurred in the crystal and if both of the annihilation quanta escaped the crystal in every instance. This graph also makes allowance for the effect of bremstrahlung radiation which reduces the intensity of the spectral lines for the higher-energy gamma rays. It is to be noted that there is excellent agreement between the two spectra of Figs. 8A and 8B. The primary difference between the two graphs is the omission of spectral lines in Fig. 8B for events due to pair-production where only one, rather than both, of the annihilation quanta escaped the crystal detector. This type of event provides gamma ray lines in Fig. 8A having an energy of about one-half m.e.v. greater than that of the lines shown in Fig. 8B. The presence of such lines in Fig. 8A results from the fact that the physical size of the crystal detector used was not sufficiently small to completely suppress the spectral line occurring when only one annihilation quantum escaped. The spectral line for hydrogen in Figs. 8A and 8B corresponds to the full energy of the hydrogen neutron-capture gamma ray. This may be accounted for by recognition of the fact that the hydrogen gamma ray has a comparatively low energy, and hence there is relatively more likelihood that the entire energy of the gamma ray is dissipated within the crystal as a result of double Compton scattering. For this reason, there is a strong spectral line corresponding to the full energy of the hydrogen neutron-capture gamma ray. In other measurements, spectral lines have been observed for hydrogen corresponding to the pair-production interaction with the escape of one or both annihilation quanta.

Figure 8C:
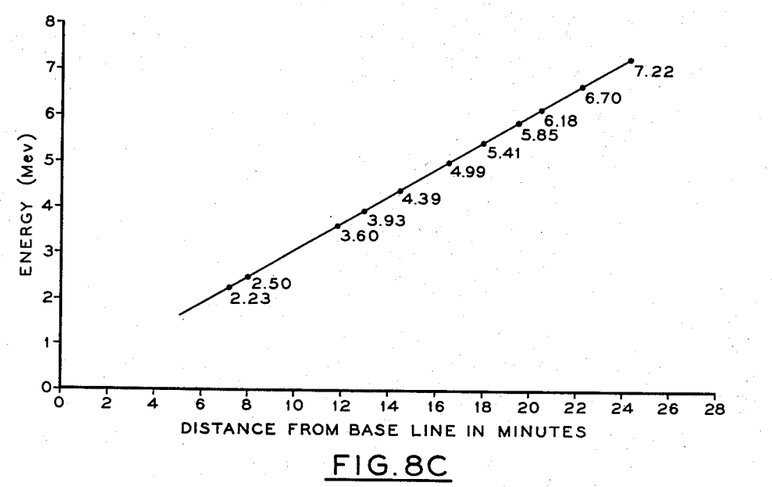
Fig. 8C shows a graph used to obtain the energies of lines of unknown energy in a spectrum recorded for a shale type of formation.

Fig. 8C demonstrates the method used to find the energies of unknown spectral lines by the photographic method. The pulse height on the photographic negative is calibrated by gamma rays of known energy. In this instance, the circled points were used for calibration. They are 2.23 m.e.v., the full energy of the 2.23 m.e.v. neutron-capture gamma ray of hydrogen, and 3.93 m.e.v., the energy of the 4.95 m.e.v. neutron-capture gamma ray of silicon, minus the 1.02 m.e.v. of energy required to create the rest mass of a positive and a negative electron.

As noted above, there is very good agreement between the results of the logging measurements as illustrated in Fig. 8A and the theoretically calculated values of Fig. 8B. Such agreement is obtained in spite of the difficulty that the logging measurements are made from neutron-capture gamma rays originating within a large volume of unknown material. The gamma ray spectrum measured in the bore hole is influenced to considerable extent by the filtering and degrading effect of the formation. In fact, the effect of scattering and absorption by the formation is severe. However, the data displayed herein demonstrate conclusively that this obstacle is surmountable by carrying out such measurements in accordance with the method of the present invention. Corrections have not been made in the graph of Fig. 8B to show theoretical estimates of the effect of the formation itself on the gamma ray spectrum. Such estimations can be made, however, to provide even closer agreement between the graphs of Fig. 8A and 8B.

Figure 9:
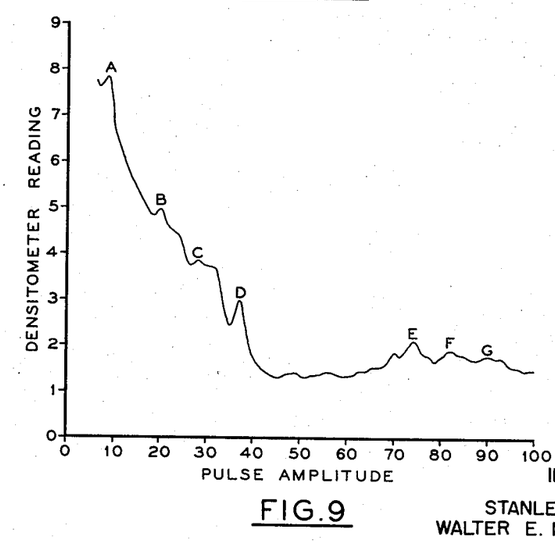
Fig. 9 illustrates a neutron-capture gamma ray spectrum for an anhydrite type of formation.

The results displayed above for the photographic analysis method were obtained by visual examination of the film. An analysis may also be made by using a film densitometer. A spectrum obtained in this way is shown in Fig. 9. The film exposure was made using a grey wedge over the oscilloscope face. The wedge was oriented so that it reduced the intensity of large amplitude pulses relative to the intensity of small amplitude pulses. During this exposure, the small amplitude pulses were considerably more numerous than the large amplitude pulses, and so use of the grey wedge kept the degree of film exposure more uniform over the spectrum. This was useful as it effectively increased the operating range of the film densitometer.

The formation under investigation in the measurement shown in the graph, Fig. 9, included dolomite, sulfur, and water. The concentrations were such that the amount of calcium and sulfur correspond to that which would have been present in an anhydrite formation. The spectral peaks are identified as follows: A is a 0.48 m.e.v. gamma ray from the boron shielding surrounding the crystal detector. B is a 1.21 m.e.v. spectral peak resulting from pair-production by the 2.23 m.e.v. hydrogen neutron-capture gamma ray with the escape of both annihilation quanta. C is a spectral line resulting from pair-production by the 2.23 m.e.v. hydrogen neutron-capture gamma ray wtih the escape of one annihilation quantum. D is a spectral line corresponding to the full energy of the hydrogen neutron-capture gamma ray. E is a spectral peak for pair-production by the 5.43 m.e.v. neutron-capture gamma ray from sulfur with the escape of both annihilation quanta. F is a spectral peak for pair-production by the 5.43 m.e.v. neutron-capture gamma ray from sulfur with the escape of one annihilation quantum. G is a spectral peak for pair-production by the 6.40 m.e.v. neutron-capture gamma ray of calcium with the escape of both annihilation quanta.

Figure 10:
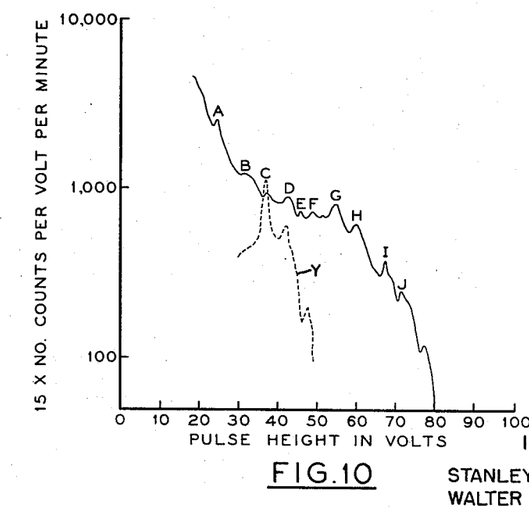
Fig. 10 shows the neutron-capture gamma ray spectrum for a sandstone type of formation containing interstitial salt water.

Fig. 10 shows a spectrum analysis made with an electronic differential discriminator for a formation of sand plus brine. The brine salinity corresponds to that frequently encountered in well bores as formation interstitial water. This spectrum was measured while the formation was being subjected to irradiaton by a radium-beryllium neutron source. For this reason, the hydrogen peak is not as clearly defined as in the preceding figures. In addition, the discriminator channel width was somewhat larger than desirable for providing maximum resolution of the hydrogen peak. However, under these more difficult conditions, peak A is clearly delineated as the peak originating from complete absorption of the neutron-capture gamma ray of hydrogen within the detector crystal. Peaks F, G, H and J result from neutron-capture gamma rays of chlorine. In particular, peak G results from the pair-production effect for the 6.12 gamma ray produced by neutron capture in chlorine with the escape of both annihilation quanta from the crystal. Peaks B, C and D result from neutron-capture gamma rays of silicon.

The dashed curve Y on Fig. 10 is a calibration measurement made with a polonium-beryllium source. The three peaks in curve Y are measurements of the 4.45 m.e.v. gamma ray originating from the excited state of carbon-12 produced in the reaction of polonium alpha-particles with beryllium nuclei. The highest peak in curve Y resulted from the pair-production effect when both annihilation quanta escaped from the crystal. The other peaks result from the pair-production effect with only one annihilation escaping and with neither escaping.

From the foregoing, and utilizing the highly-sensitive combination of apparatus disclosed and claimed herein, one skilled in this art is able to determine many of the major constituents of the formation and fluids therein being logged at the same time that they are being bombarded by the neutrons. The pulse height differential discriminator is of particular value in this regard, as will be apparent from the typical charts just described. It will be apparent from the foregoing description that this invention particularly concerns the identification of formation constituents by the measurement of characteristic energies of gamma radiation induced by neutron capture, and provides a method of studying such neutron-capture gamma rays in the presence of other gamma rays.

In conclusion, it will be appreciated that this invention comprehends broadly an improved method and apparatus for nuclear well logging, and particularly neutron-capture gamma radiation well logging, characterized by the combination of a scintillation counter, or phosphor-photomultiplier detector unit, with a linear amplifier and differential discriminator equipment and suitable transmitters and recorders to indicate, separately, pulse heights due to the several elements contained in the earth formations traversed.

Although several specific illustrations have been given of apparatus for practicing the method of the present invention, it is to be understood that modifications and changes could be made without departing therefrom, and all such procedures and arrangements that fall within the scope of the appended claims are intended to be embraced thereby.

We claim:

1. A method of identifying unknown constituent elements of an earth formation traversed by a well bore which comprises the steps of irradiating said earth formation with a neutron source, surrounding said source with a material having a small neutron-capture cross-section and a high gamma ray absorption characteristic for gamma rays from said source, positioning a gamma ray detector adjacent said formation and vertically spaced from said source, shielding said detector from thermal neutrons diffused in said formation, detecting neutron-capture gamma rays instantaneously emitted by nuclei of elements in an excited state within said formation due to the capture of neutrons from said source by constituent nuclei of the formation, converting a known fraction of the energy of each of said neutron-capture gamma rays to light photons whose total number is proportional to the individual dissipated energy of each of said neutron-capture gamma rays, generating an electrical signal proportional in magnitude to said total number of light photons, and recording the frequency of repetition in a given time of each of said neutron-capture gamma rays having a characteristic energy, said frequency of repetition being representative of the amount of a constituent element in said earth formation.

2. A method of identifying unknown constituent elements in an earth formation traversed by a well bore which comprises the steps of irradiating said earth formation with a neutron source, surrounding said source with a material having a small neutron-capture cross-section and a high gamma ray absorption characteristic for gamma rays from said source, positioning a gamma ray detector adjacent said formation and vertically spaced from said source, shielding said detector from thermal neutrons diffused in said formation, shielding the detector from low-energy gamma rays multiply scattered in said formation, detecting neutron-capture gamma rays instantaneously emitted by nuclei of elements in an excited state within said formation due to the capture of neutrons from said source by constituent nuclei of the formation, converting the energy of each of said neutron-capture gamma rays to light photons whose total number is proportional to a known fraction of the individual energy for the pair-production effect of each of said neutron-capture gamma rays, generating an electrical signal proportional in magnitude to said total number of light photons, and recording the frequency of repetition in a given time of each of said neutron-capture gamma rays having a characteristic energy, said frequency of repetition being representative of the amount of a constituent element in said earth formation.

3. A method of identifying unknown constituent elements of an earth formation traversed by a well bore which comprises the steps of irradiating said earth formation with neutrons from a neutron source, positioning a gamma ray detector adjacent said formation and vertically spaced from said neutron source, shielding said detector from neutrons slowed-down and diffused in said formation, shielding said detector from gamma rays emitted by said source with a material having a small neutron-capture cross-section, detecting neutron-capture gamma rays instantaneously emitted by nuclei of elements in an excited state within said formation due to the capture of neutrons from said source by constituent nuclei of the formation, converting the energy of each of said neutron-capture gamma rays to light photons whose total number is related in a known manner for the pair-production effect to the individual energy of each of said neutron-capture gamma rays, generating an electrical signal proportional in magnitude to said total number of light photons, and recording the frequency of repetition in a given time of each of said neutron-capture gamma rays having a characteristic energy, said frequency of repetition being representative of the amount of a constituent element in said earth formation.

4. A method of logging the unknown constituent elements contained in an earth formation traversed by a well bore comprising the steps of irradiating said earth formation with neutrons from a polonium-beryllium source, positioning a scintillation detector adjacent said formation and vertically spaced from said source, positioning a bismuth shield between said source and said detector to prevent gamma rays emitted by said source from reaching said scintillation detector, positioning a boron shield between said detector and said formation for excluding thermal neutrons diffused in said formation, surrounding said scintillation detector with a bismuth shield to exclude low-energy gamma rays from said detector, detecting with said detector gamma rays instantaneously emitted by the nuclei of elements in an excited state within said formation due to capture of neutrons emitted by said source, measuring the energy of each of said neutron-capture gamma rays, and recording the number in unit time of neutron-capture gamma rays having a characteristic energy in accordance with the depth of said source and said scintillation detector in said well bore.

5. A method of identifying unknown constituent elements of an earth formation traversed by a well bore which comprises the steps of irradiating said earth formation with a neutron source, positioning a gamma ray detector adjacent said formation and vertically spaced from said source, shielding said detector from thermal neutrons diffused in said formation, said shielding having the property of generating negligible numbers of high-energy neutron-capture gamma rays when irradiated by said source, detecting neutron-capture gamma rays instantaneously emitted by nuclei of elements in an excited state within said formation due to the capture of neutrons from said source by constituent nuclei of the formation, converting the energy of each of said neutron-capture gamma rays to light photons whose total number is related in a known manner for the pair-production effect to the individual energy of each of said neutron-capture gamma rays, generating an electrical signal proportional in magnitude to said total number of light photons, and recording the frequency of repetition in a given time of each of said neutron-capture gamma rays having a characteristic energy, said frequency of repetition being representative of the amount of a constituent element in said earth formation.

6. Apparatus for identifying unknown constituent elements of earth formations traversed by a well bore comprising means for positioning a neutron source within said well bore, means for positioning a scintillation detector within said well bore at a predetermined vertical distance from said neutron source, bismuth shielding means between said detector and said neutron source for shielding said detector from gamma rays emitted by said source and for reducing the probability of neutron-capture gamma rays from being generated in said shielding means, boron shielding means surrounding said detector for excluding thermal neutrons diffused within an earth formation from entering said detector, additional bismuth shielding means surrounding said detector to exclude low energy radiation from said detector, means for converting the energy of neutron-capture gamma rays entering said detector to an electrical signal proportional in magnitude to the energy of each of said neutron-capture gamma rays, and means for recording the frequency of repetition in a given time of said electrical signals in accordance with the depth of said source and detector in a well bore.

7. Apparatus for identifying unknown constituent elements of an earth formation traversed by a well bore comprising means for positioning a neutron source in said well bore, means for positioning a gamma ray detector within said well bore and vertically spaced from said neutron source, means for shielding said detector from gamma rays emitted by said source and from low energy radiation including means surrounding said source having a small neutron-capture cross-section and a high gamma ray absorption characteristic for gamma rays, said gamma ray detector comprising a scintillation crystal of thallium-activated sodium iodide having volumetric dimensions of not over about one cubic inch to assist the escape of annihilation quanta from said crystal when high-energy gamma rays are absorbed in said crystal by the pair-production effect, means for converting the dissipated energy of neutron-capture gamma rays emitted by nuclei of elements in an excited state within said earth formation due to the capture of neutrons from said source by constituent nuclei of the formation to an electrical signal proportional in magnitude to said dissipated energy, and means for recording in accordance with the depth of said source and said detector in a well bore the frequency of repetition in a given time of the electrical signals representing the number of neutron-capture gamma rays having characteristic energies related to the amount of a constituent element in said formation.

8. A method of identifying the unknown elements contained in an earth formation traversed by a well bore which comprises traversing said well bore with a neutron source to irradiate said earth formation, surrounding said source with a material having a small neutron-capture cross-section and a high gamma ray absorption characteristic for gamma rays from said source, traversing said well bore with an energy-sensitive detector to intercept the neutron-capture gamma rays instantaneously emitted by the nuclei of elements in an excited state within said earth formation due to capture of neutrons emitted by said source, shielding the detector from thermal neutrons, shielding the detector from gamma rays of energy less than a predetermined value, measuring the energy of each of said neutron-capture gamma rays absorbed by said detector and recording the number per unit time of said neutron-capture gamma rays having energies characteristic of the nuclei of said unknown elements in accordance with the depth of said source in said well bore.

References Cited in the file of this patent

UNITED STATES PATENTS

| | | |
|---|---|---|
| 2,617,042 | Wouters | Nov. 4, 1952 |
| 2,648,012 | Scherbatskoy | Aug. 4, 1953 |
| 2,659,011 | Youmans et al. | Nov. 10, 1953 |
| 2,692,949 | MacKnight | Oct. 26, 1954 |
| 2,752,504 | McKay | June 26, 1956 |